C. A. SPICKLER.
ADJUSTABLE LINER.
APPLICATION FILED MAY 6, 1916.
1,241,676.
Patented Oct. 2, 1917.
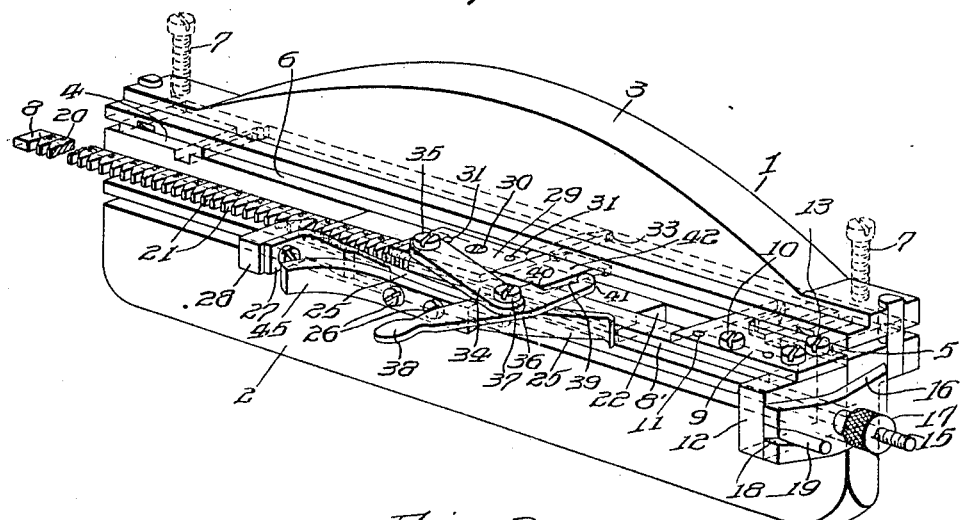
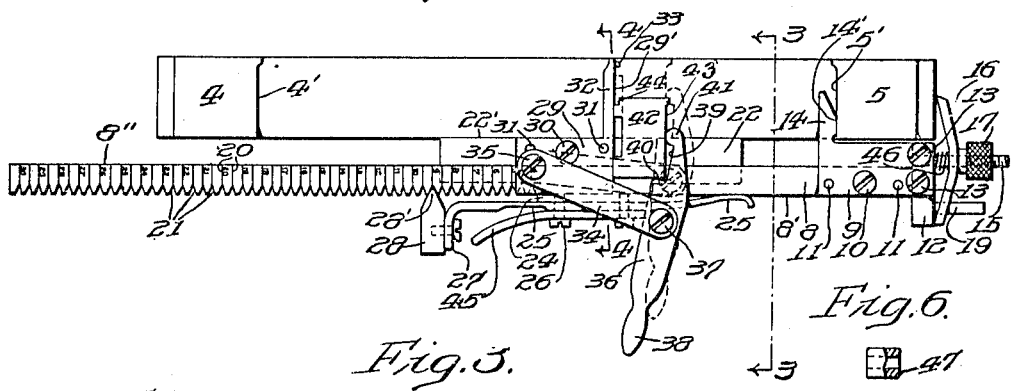
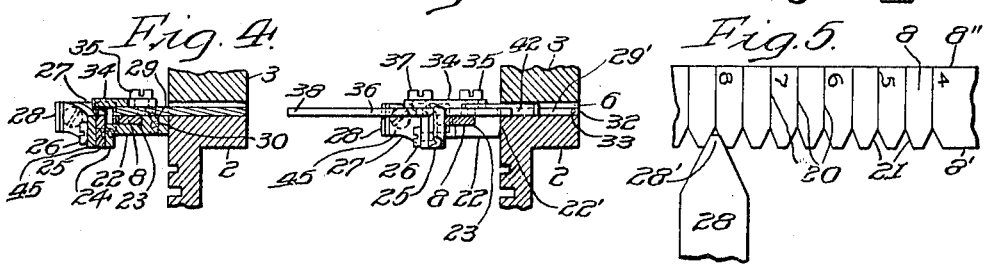
INVENTOR
Charles A. Spickler.
WITNESS
F. J. Hartman.
BY
ATTORNEYS

UNITED STATES PATENT OFFICE.

CHARLES A. SPICKLER, OF PHILADELPHIA, PENNSYLVANIA.

ADJUSTABLE LINER.

1,241,676.  Specification of Letters Patent.  Patented Oct. 2, 1917.

Application filed May 6, 1916. Serial No. 95,769.

*To all whom it may concern:*

Be it known that I, CHARLES A. SPICKLER, a citizen of the United States, and a resident of the city of Philadelphia, county of Philadelphia, and State of Pennsylvania, have invented certain new and useful Improvements in Adjustable Liners, of which the following is a full, complete, and exact disclosure.

My invention relates to adjustable liners, and more particularly to a liner comprising an implement or tool which is independent of and may be adjusted on and with respect to the mold of a standard linotype machine.
Heretofore it has been attempted to cast lines of variable length in a linotype machine by inserting in the mold one of a series of gages, each gage differing from another by a predetermined and standard length, as for instance, by one or by one-half of a pica, said gages being clamped into the mold after their insertion to cast a line of type in the unfilled portion of the mold. One of the objects of my invention is to obviate the necessity of the use of such a set or series of gages.

It has also been attempted to adjust the length of the line to be cast in a linotype machine by inserting in a mold which is provided with a series of transverse grooves spaced from each other by distances of a pica or half a pica, a slug having therein coöperating grooves or ridges by means of which the slug may be accurately positioned in the mold and provide a space between the upper and lower halves of the mold, the length of which is equal to the length of the line which it is desired to cast, but such constructions require the providing of a special mold and special slugs. The object of this invention is to provide a device for accurately positioning a slug or liner in a mold without the necessity of providing a special mold or of changing in any respects the structure of the standard linotype mold.

One of the objects of my invention is to provide an implement, tool, instrument or gage by means of which a slug commonly called a "liner", may be accurately positioned in the space between the upper and lower parts of the mold of a linotype machine in any desired position; to provide a space between the slug and the right hand end of the mold which is of the proper length desired for casting a line of type of a predetermined length; to provide a tool or implement which is readily attached to and is also as readily removed from and entirely separated from the mold; to provide a structure which will set off from the right hand end of the mold positions in terms of picas and half picas and will place a slug in that position in which it may be permanently clamped between the upper and lower halves of the mold proper.

Further objects of my invention are to provide an implement to vary and adjust the substantial length of the mold slot of a linotype machine; to provide a device which will accurately place a slug or liner in a mold and permit the same to be clamped in position without interfering with the removal of the device from the mold after the slug has been clamped therein and without disturbing the position of the slug; and to provide an adjustable liner which can be readily and almost instantly accurately adjusted to different lengths of lines to be cast in the linotype machine.

Other objects of my invention will appear in the specification below.

Referring to the drawings forming a part of this application and in which the same reference characters are used throughout the various views to designate the same parts, Figure 1 is a perspective view of a linotype mold with my invention secured thereto in use for inserting and positioning the slug or "liner" in the mold; Fig. 2 is a plan view showing the mold cap removed, the other parts remaining in the position shown in Fig. 1; Fig. 3 is a transverse section of the mold and of my device attached thereto taken on the line 3—3 of Fig. 2; Fig. 4 is a similar sectional view taken on the line 4—4 of Fig. 2; Fig. 5 is an enlarged view of a detail of construction; and Fig. 6 is a detailed view of a tube or washer which may be used to adapt my device to the molds of different types or kinds of line-casting machines.

A standard mold 1 of a linotype machine is composed of a lower half or portion 2 and an upper half or portion 3 spaced from each other by liners 4 and 5 to provide a slot 6 between the same, which slot constitutes the mold into which the molten type metal is cast in casting a line of type. The upper and lower parts 2 and 3 of the mold are held in a fixed position with respect to each other by the usual clamping screws 7—7 extending through the disk or face plate (not shown) upon which the mold is mounted in a linotype machine of standard construction.

The mold slot 6 is of a length to cast a line of type equal to the full capacity of the machine, but it often occurs that a line of less length than that of which the machine is capable of casting is required to be cast by said machine. To do this, the left hand liner 4 is removed and a different liner, the inner side (corresponding to 4' of the liner 4) of which is nearer to the inner side 5' of the right hand liner 5 is substituted therefor to make the mold of the desired length. Such operation of a linotype machine necessitates, of course, the employment of a complete set or series of liners 4, each differing from the next in series by say one-half of a pica. It is to obviate the necessity of such a series of liners that the present invention has for one of its objects.

My adjustable liner comprises a bar 8, to the right hand end of the top of which is secured a plate 9 by a screw 10 and steadying or positioning pins or studs 11—11, and to the underside of which is secured a block 12 by screws 13, 13 passing through said plate 9, bar 8 and into said block 12. The plate 9 has an inwardly extending finger 14, the surface 14' of which is adapted to squarely engage the inner side 5' of the liner 5 in positioning the device on a mold of a linotype machine. From the outer left hand end of the block 12 there projects a screw stud 15 passing through a spring plate 16 and over the outer end of which may be threaded a clamping nut 17. The spring plate 16 is provided on its front end with a slot 18 within which lies a stud 19 projecting from the left hand front side of the block 12. The other end of the spring extends beyond the inner side of the block 12 and is adapted to engage the outside of the lower half 2 of the mold. The bar 8 is provided with graduations 20 on the top face thereof, the graduations being in terms of picas and half picas, and the front edge 8' of the bar 8 is provided with a series of notches 21. These notches are preferably V-shaped and the apex of the V is accurately made to correspond to the graduations 20 on the top face of the bar 8.

Mounted upon the bar 8 so as to be smoothly slidable longitudinally thereof is a block 22 having its front edge provided with a recess 23 the lower wall of which fits and smoothly bears against the underside of the bar 8, while the other wall bears against the inner rear edge 8" of the bar 8. The depth of the recess 23 is equal to the thickness of the bar 8. The front edge 8' of the bar 8 projects forwardly out of the recess 23 in the block 22 as is clearly shown in Fig. 4. The block 22 on its forward edge may be provided with a depending lug 24 to the front face of which a leaf spring 25 is secured by screws 26—26. The right hand end of said leaf spring 25 extends slightly upwardly and its free end bears against the front edge 8' of the bar 8 and the left hand end of the spring 25 is provided with an outwardly turned portion 27 to which is attached a block 28 having a substantially V-shaped projection 28' adapted to smoothly fit into any one of the notches 21 in the front edge 8' of the bar 8.

To the top of the block 22 is secured a plate 29 by a screw 30 and steadying or positioning pins 31—31, the underside of the plate 29 bearing smoothly and evenly against the top side of the bar 8. The height or thickness of the plate 29 is slightly less than the width of the mold slot 6. The right hand edge 29' of the plate 29 is square with respect to the bar 8 and the plate 29 extends rearwardly adjacent this edge to form a finger 32 having a stop pin 33 near the rearmost extremity thereof in the edge 29' of the finger 32. Mounted upon the top of the plate 29 is a freely moving link 34 pivotally secured at one end to said plate 29 by a pivot screw or stud 35. The underside of the link 34 slides over and is guided by the top surface of the plate 29. To the free end of the link 34 is pivoted a lever 36 upon a pivot screw or stud 37 and freely movable thereabout as a center. One end of the lever 36 is provided with a handle 38 and the other end, on the opposite side of its pivot stud 38, is provided with a notch 39 forming a shoulder 40. Said latter end of said lever 36 is preferably provided with a rounded laterally extending projection 41. The lever 36 is thus carried by the free end of the link 34 and the opposite sides of the lever 36 are respectively in the same plane as the opposite sides of the finger 14.

The rear face 22' of the block 22 is a plane surface which is adapted to bear evenly and squarely against a front face of the lower half 2 of the mold 1 and thus hold the bar 8 which, as will have been seen, is substantially a graduated scale parallel to the face of the mold and said rear face 22' is sufficiently far rearwardly from the front of the device that when the finger 14 is inserted in the mold slot 6 and the surface 14' of the finger 14 is against the edge 5' of the right hand liner 5, the graduated scale will be parallel to the mold slot 4 and the only part of the device in engagement with the mold will be the rear face 22' of the block 22, the finger 14 and the free end of the spring plate 16.

The operation of my device is as follows: Let us suppose that a line of type nine picas in length is to be cast in the linotype mold. The block 28 is sprung from out of engagement with the notches 21 in the front edge 8' of the bar 8 and the scale or bar 8 is slid with respect to the block 28 in the recess 23 until the sharp V-shaped edge of the block 28 is opposite the graduation 9. At this point, the block 28 is released and the V-shaped edge 28' thereof will enter and snugly engage the opposite walls of the notch opposite the numeral 9. The device is then inserted in the mold slot 6; that is to say, the finger 14 and the finger 32 are inserted in the slot 6 and pushed inwardly until the flat surface 22' of the block 22 engages the front face of the lower half 2 of the mold 1. The spring plate 16 may then be brought into engagement with the outer side of the mold and by turning the clamping nut 17, the surface 14' of the finger 14 will be drawn and tightly held against the surface 5' of the right hand liner of the mold. The graduations 20 on the bar 8 are so arranged that the edge 43 of the slug 42 is at that distance from the surface 14' of the finger 14 as that which is indicated by the engagement of the block 28 with the graduated notch coöperating therewith; that is to say, when the block 28 is in engagement with the notch corresponding to the graduation 9, the edge 43 is removed a distance of nine picas from the surface 14' of the finger 14.

The device having been attached in this manner to the front of the mold block, the link 34 with the lever 36 attached thereto is swung well to the left around the pivot pin 35 and a slug 42 is spaced on the top of the block 22 so that it rests on the block and on the top face of the rod 8 with its left hand edge against the edge 29' of the plate 29. The handle 38 is then grasped and both the link 34 and lever 36 are manually swung until the shoulder 40 engages the front edge of the slug 42 and then the handle 38 is swung to the left to bring the rounded lateral extending projection 41 against the right hand edge of the slug 42. In this manner the projection 41 will force the slug 42 over firmly and squarely against the edge 29' of the plate 29. Holding the slug in this manner the handle 38 is forced inwardly around, the link and lever turning around the pivot screw 35 of the center and this action slides the slug 42 into the slot 6 holding it firmly and squarely against the edge 29' until the end of the slug 42 strikes against the pin or stop 33 projecting therefrom. The stop pin 33 is so positioned on the finger 32 that when the coöperating notch 44 engages the stop pin 33, the rear edge of the slug 28 will be in the plane of the rear surface of the mold. In this position, the screws 7—7 are clamped down hard to force the upper half 3 of the mold into tight engagement with the lower half 2 of the mold and in so doing, the slug or "adjustable liner" 42 will be rigidly clamped in proper position with its left hand edge exactly nine picas removed from the coacting surface 5' of the right hand liner 5.

The clamping nut 17 may be then unscrewed to remove any pressure between the free end of the spring plate 16 and the mold 1, whereupon the device as a whole may be readily removed from the mold by moving the device sidewise to the left until the stop pin 33 clears the notch 44 in the slug 42 and thus bodily withdrawing the fingers 14 and 32 out from the mold slot.

As previously stated, the notches 21 in the front edge 8' of the bar 8 are V-shaped and the bottom of the V is preferably very sharp. The end 28' of the block 28 is also V-shaped, generally speaking, but the sharp point of the V is preferably removed or flattened so that the only engagement between the block 28 and the notch with which it is coöperating is between the slanting sides of the notch and block respectively. This provides for a very accurate positioning of the bar 8 with respect to its block 22 and any slight accumulation of dirt or dust in the bottom of the V-shaped notches 21 will not interfere with the accurate positioning of the parts with respect to each other.

The tension of the spring 25, particularly that part of it which carries the block 28, is preferably relatively adjusted so that when the V-shaped edge 28' enters one of the notches 21, the tension of the spring forces the edge into the notch with sufficient tension to insure the engagement of the opposite tapering sides of the block 28 with the opposite sides of the notch into which it fits, thus accurately positioning the edge 29' with respect to the surface 14'.

In order that the block 28 may not be accidentally or manually drawn outwardly sufficiently far to impair the tension of the spring 25, I preferably provide the block 22 with a stop guard or finger piece 45, which may preferably consist of a relatively stiff bar secured to the block 22 by the screws 26 and thereby clamped firmly against the spring 25. This stop or guard 45 will thus prevent the spring 25 from being bent outwardly far enough to weaken the tension thereof. This stop or guard 45 also provides a support against which the finger of the operator may bear in bringing the block 28 out of engagement with any of the notches 21. It forms a support for the hand or finger of the operator and enables him to readily withdraw the edge 28' from engagement with a notch 21 and to hold the block 28 out of engagement with the notches 21 until the block 22 shall have been moved longitudinally of the gage 8 to such position as into which it is desired to adjust or readjust the gage for different lengths of lines to be cast in the line-casting machine.

To facilitate the adjustment of the spring plate 16 to the outside of the mold, I may provide a light coiled spring 46 between the end of the block 12 and the spring 16, said spring 46 preferably surrounding the screw stud 15.

To adapt my device for use in connection with any of the various line-casting machines which are or may be on the market and with which my device is adapted to be used, the stud 19 and the screw stud 15 may be made of a length sufficient to adapt the device for that line-casting machine having the thickest wall between the inner right hand end of the mold slot and the outside right hand end of the mold. For such molds, washers or tubes 47 of different and appropriate lengths may be placed over the stud 19 between the spring 16 and the block 12 to bring the outer end of the spring 16 into substantial alinement with the right hand outer face of such mold or mold block, such adjustments and such provisions being fully contemplated by me and are within the scope and aim of my invention.

What I claim and desire to secure by Letters Patent is:

1. In an adjustable liner, the combination of a gage, means to hold said gage pressed against the inner end of a mold of a line casting machine, said gage extending parallel to said mold, a carrier slidable longitudinally of said gage, means to lock said carrier to said gage in different positions, and means mounted on said carrier to insert a stop-off slug or liner into said mold.

2. In an adjustable liner, the combination of a gage, means to hold said gage pressed against the right hand inner end of a mold of a line casting machine, and parallel to the mold slot in said mold, a carrier slidable longitudinally of said mold to lock said carrier to said gage in positions differing from each other in terms of one-half a pica, and means to insert a stop-off slug into said mold at a distance from the right hand end of said mold equal to that indicated by the position of said carrier on said gage.

3. In an adjustable liner, a gage having half pica graduations thereon, means on said gage to position and hold said gage pressed against the right hand inner end of a mold slot of a line casting machine and parallel thereto, a carrier slidable longitudinally of said gage, means to lock said carrier to said gage in positions differing from each other in terms of one-half a pica, and means to insert a stop-off slug into said mold at a distance from said right hand end of said mold slot equal to that indicated by the position of said carrier on said gage.

4. In an adjustable liner, the combination of a gage having one-half pica graduations, a carrier mounted to slide longitudinally of said gage, means to lock said carrier at a predetermined point on said gage in positions differing from each other in terms of one-half a pica, and means on said carrier to slide a stop-off slug or liner transversely of said gage into a mold.

5. In an adjustable liner, the combination of a gage having notches in the front edge thereof and provided at one end with a finger provided with a guiding surface extending rearwardly from said gage at right angles to the front edge of said gage, a carrier slidable on said gage and having a guiding surface extending rearwardly from said carrier at right angles to the front edge of said gage and also provided with a surface adapted to bear against the face of a mold, a stop adjacent the rear end of said rearwardly projecting finger on said carrier, means mounted on said carrier to lock said carrier in any desired position longitudinally of said gage, and means mounted on said carrier to push a stop-off lug or liner rearwardly against said stop and to press said slug into square engagement with said guiding surface on said carrier.

6. In an adjustable liner, the combination of a gage provided with graduations and with notches in the front face edge thereof, a carrier slidable longitudinally of said gage with a rearwardly extending projection having a flat surface lying in a plane normal to the front edge of said gage, means mounted on said carrier adapted to fit into one of said notches to lock said carrier with respect to said gage in different adjusted positions, and means mounted on said carrier to push a stop-off slug or liner rearwardly to hold said slug pressed against said guiding surface.

7. In an adjustable liner, the combination of a gage provided with graduations and with notches in the front face edge thereof, a carrier slidable longitudinally of said gage with a rearwardly extending projection having a flat surface lying in a plane normal to the front edge of said gage, means mounted on said carrier adapted to fit into one of said notches to lock said carrier with respect to said gage in different adjusted positions, and means pivoted to the top of said carrier and arranged to push a stop-off slug or liner rearwardly to hold said slug pressed against said guiding surface.

8. In an adjustable liner, the combination of a gage, a carrier slidable longitudinally of said gage and provided with a rearwardly extending projection provided with a square surface lying in a plane normal to the front of said gage, a link pivoted to the top of said carrier, a lever pivoted to said link and provided on its front end with a handle and on its rear end with a projection to engage the front side of a slug or liner, and a second projection to engage the right hand side of said stop-off slug.

9. In an adjustable liner, the combination of a gage having a projection extending rearwardly from one end thereof and having a surface lying in a plane normal to the front edge of said gage, means to clamp said gage to a mold with said surface held squarely against the inner side of a mold slot of a line casting machine, a carrier slidable on said gage longitudinally thereof and having a finger provided with a guiding surface extending rearwardly parallel to said first mentioned surface, means to lock said carrier to said gage in any predetermined position longitudinally of said gage, and means mounted on said carrier to hold a stop-off slug or liner squarely against said guiding surface and to slide said slug rearwardly into said mold.

10. In an adjustable liner, the combination of a gage having a projection extending rearwardly from one end thereof and having a surface lying in a plane normal to the front endge of said gage, means to clamp said gage to a mold with said surface held squarely against the inner side of a mold slot of a line casting machine, a carrier slidable on said gage longitudinally thereof and having a finger provided with a guiding surface extending rearwardly parallel to said first mentioned surface, means to lock said carrier to said gage in any predetermined position longitudinally of said gage, means mounted on said carrier to hold a stop-off slug or liner squarely against said guiding surface and to slide said slug rearwardly into said mold, and a stop on the rear end of said guiding surface to limit the movement of said slug rearwardly.

11. In an adjustable liner, the combination of a gage having graduations on the top thereof and notches in the front edge thereof and provided with a surface extending rearwardly adjacent one end thereof disposed in a plane normal to the front edge of said gage, means to clamp said gage to the mold of a line casting machine with said surface held squarely against the inner end of the mold, a carrier slidable longitudinally of said gage having a finger provided with a guiding surface extending rearwardly parallel to said first mentioned surface, means mounted on said carrier and arranged to fit into any one of said notches to lock said carrier to said gage, and means mounted on said carrier to hold a stop-off slug or liner squarely against said guiding surface to slide said slug rearwardly into said mold.

12. In an adjustable liner, the combination of a gage having graduations on the top thereof and notches in the front edge thereof and provided with a surface extending rearwardly adjacent one end thereof disposed in a plane normal to the front edge of said gage, means to clamp said gage to the mold of a line-casting machine with said surface held squarely against the inner end of the mold, a slot in said mold, a carrier slidable longitudinally of said gage having a finger provided with a guiding surface extending rearwardly parallel to said first mentioned surface, means mounted on said carrier and arranged to fit into any one of said notches to lock said carrier to said gage, means mounted on said carrier to hold a stop-off slug or liner squarely against said guiding surface to slide said slug rearwardly into said mold, and a stop on the rear end of said guiding surface to limit the movement of said slug rearwardly.

13. In an adjustable liner, of a gage having graduations on the top thereof and notches in an edge thereof, of a carrier, slidably mounted to spring, a detent mounted on said spring and arranged to be normally pressed by said spring into one of said notches and arranged to be withdrawn from a notch to permit of relative movement between said gage and said carrier, and means mounted on said carrier to limit the extent of the movement of said detent away from said gage.

14. In an adjustable liner, the combination of a gage having notched in an edge thereof, a carrier, a spring mounted on said carrier, a detent mounted on said spring and arranged to be normally pressed by said spring into one of said notches and arranged to be withdrawn from said notch to permit of the relative movement between said gage and said carrier, and a finger piece mounted on said carrier arranged to form a rest for the hand of the operator in withdrawing said detent from said notch.

15. In an adjustable liner, the combination of a gage having V-shaped notches in an edge thereof, a carrier mounted on said gage, a spring mounted on said carrier, a detent mounted on said spring, said detent having a V-shaped end adapted to fit into any of said notches and fit against the sides thereof, said spring tending to force said detent into any of said notches, with sufficient pressure to move said carrier with respect to said gage and bring the sides of the detent into operative engagement with the sides of a notch.

In witness whereof, I have hereunto set my hand this 4th day of May, 1916.

CHARLES A. SPICKLER.